United States Patent
Tuttle

(10) Patent No.: US 7,855,643 B2
(45) Date of Patent: Dec. 21, 2010

(54) TRACKING SYSTEMS, PASSIVE RFIDS, METHODS OF LOCATING AND IDENTIFYING RFIDS, AND METHODS OF TRACKING ITEMS

(75) Inventor: John R. Tuttle, Boulder, CO (US)

(73) Assignee: Round Rock Research, LLC, Mount Kisco, NY (US)

( * ) Notice: Subject to any disclaimer, the term of this patent is extended or adjusted under 35 U.S.C. 154(b) by 689 days.

(21) Appl. No.: 11/595,683

(22) Filed: Nov. 10, 2006

(65) Prior Publication Data

US 2008/0111675 A1 May 15, 2008

(51) Int. Cl.
*G08B 13/14* (2006.01)
(52) U.S. Cl. .............. 340/572.1; 340/572.4; 340/572.7; 340/825.49; 235/462.07; 235/375; 235/385; 235/492; 235/495; 700/95; 700/115; 700/116
(58) Field of Classification Search .............. 340/572.1, 340/572.4, 572.7, 825.49; 235/386, 462.01, 235/492, 495, 462.07, 375, 385; 700/95, 700/115, 116
See application file for complete search history.

(56) References Cited

U.S. PATENT DOCUMENTS

| | | | |
|---|---|---|---|
| 4,075,632 A | 2/1978 | Baldwin et al. |
| 4,223,830 A | 9/1980 | Walton |
| 4,236,068 A | 11/1980 | Walton |
| 4,476,469 A | 10/1984 | Lander |
| 4,675,656 A | 6/1987 | Narcisse |
| 4,926,182 A | 5/1990 | Ohta et al. |
| 5,087,906 A | 2/1992 | Eaton et al. |
| 5,113,183 A | 5/1992 | Mizuno et al. |
| 5,119,069 A | 6/1992 | Hershkovitz et al. |
| 5,151,684 A | 9/1992 | Johnsen |
| 5,214,410 A | 5/1993 | Verster |
| 5,337,041 A | 8/1994 | Friedman |
| 5,416,486 A | 5/1995 | Koert et al. |
| 5,450,070 A | 9/1995 | Massar et al. |
| 5,539,393 A | 7/1996 | Barfod |
| 5,550,547 A | 8/1996 | Chan et al. |

(Continued)

FOREIGN PATENT DOCUMENTS

GB      2180677 A     4/1987

(Continued)

OTHER PUBLICATIONS

International Application No. PCT/US08/51272, International Search Report, Jun. 27, 2008.

(Continued)

*Primary Examiner*—Tai T Nguyen
(74) *Attorney, Agent, or Firm*—Lerner, David, Littenberg, Krumholz & Mentlik, LLP

(57) ABSTRACT

Some embodiments include observable properties triggered upon interrogation of RFIDs. The RFIDs can be passive RFIDs, and the observable properties can be visible changes that require little power to generate, and little or no power to maintain. The visible information can include information about items tracked with the RFIDs, such as shipping information. Some embodiments include passive RFIDs utilizing a single antenna to power an integrated-circuit chip and a visual identifier. Some embodiments include methods of locating interrogated RFIDs. Some embodiments include methods of tracking items.

22 Claims, 5 Drawing Sheets

U.S. PATENT DOCUMENTS

| | | | |
|---|---|---|---|
| 5,565,858 A | 10/1996 | Guthrie | |
| 5,570,080 A | 10/1996 | Inoue et al. | |
| 5,572,653 A * | 11/1996 | DeTemple et al. | 345/501 |
| 5,581,257 A | 12/1996 | Greene et al. | |
| 5,606,323 A | 2/1997 | Heinrich et al. | |
| 5,617,060 A | 4/1997 | Wilson et al. | |
| 5,621,412 A | 4/1997 | Sharpe et al. | |
| 5,649,295 A | 7/1997 | Shober et al. | |
| 5,649,296 A | 7/1997 | MacLellan et al. | |
| 5,652,569 A | 7/1997 | Gerstenberger et al. | |
| 5,656,998 A | 8/1997 | Fujiuchi et al. | |
| 5,673,023 A | 9/1997 | Smith | |
| 5,686,902 A * | 11/1997 | Reis et al. | 340/10.2 |
| 5,689,123 A | 11/1997 | Major et al. | |
| 5,689,238 A | 11/1997 | Cannon | |
| 5,689,240 A | 11/1997 | Traxler | |
| 5,742,238 A | 4/1998 | Fox | |
| 5,771,002 A | 6/1998 | Creek et al. | |
| 5,777,561 A | 7/1998 | Chieu et al. | |
| 5,787,174 A | 7/1998 | Tuttle | |
| 5,796,351 A | 8/1998 | Yabuki | |
| 5,841,770 A | 11/1998 | Snodgrass et al. | |
| 5,850,181 A | 12/1998 | Heinrisch et al. | |
| 5,850,187 A | 12/1998 | Carrender | |
| 5,861,817 A | 1/1999 | Palmer et al. | |
| 5,874,902 A | 2/1999 | Heinrich et al. | |
| 5,887,176 A * | 3/1999 | Griffith et al. | 713/320 |
| 5,905,429 A | 5/1999 | Hornstein et al. | |
| 5,912,632 A | 6/1999 | Dieska et al. | |
| 5,929,778 A | 7/1999 | Asama et al. | |
| 5,939,981 A | 8/1999 | Renney | |
| 5,940,006 A | 8/1999 | MacLellan et al. | |
| 5,949,328 A | 9/1999 | Latty | |
| 5,952,922 A | 9/1999 | Shober | |
| 5,963,133 A | 10/1999 | Monjo | |
| 5,963,177 A | 10/1999 | Tuttle et al. | |
| 5,966,082 A | 10/1999 | Cofino et al. | |
| 5,988,510 A | 11/1999 | Tuttle et al. | |
| 5,995,019 A | 11/1999 | Chieu et al. | |
| 6,008,727 A | 12/1999 | Want et al. | |
| 6,023,610 A | 2/2000 | Wood, Jr. | |
| 6,024,285 A | 2/2000 | Mish | |
| 6,027,027 A | 2/2000 | Smithgall | |
| 6,031,459 A | 2/2000 | Lake | |
| 6,052,062 A | 4/2000 | Tuttle | |
| 6,078,260 A | 6/2000 | Desch | |
| 6,084,512 A | 7/2000 | Elberty et al. | |
| 6,130,602 A | 10/2000 | O'Toole et al. | |
| 6,130,623 A | 10/2000 | MacLellan | |
| 6,133,830 A | 10/2000 | D'Angelo et al. | |
| 6,133,832 A | 10/2000 | Winder et al. | |
| 6,133,836 A | 10/2000 | Smith | |
| 6,137,422 A | 10/2000 | Hahn et al. | |
| 6,147,602 A | 11/2000 | Bender | |
| 6,150,921 A | 11/2000 | Werb et al. | |
| 6,184,789 B1 * | 2/2001 | Richley et al. | 340/571 |
| 6,198,392 B1 | 3/2001 | Hahn et al. | |
| 6,255,951 B1 | 7/2001 | De La Huerga | |
| 6,275,142 B1 | 8/2001 | Paleiov et al. | |
| 6,289,209 B1 | 9/2001 | Wood, Jr. | |
| 6,297,737 B1 | 10/2001 | Irvin | |
| 6,304,183 B1 | 10/2001 | Causey | |
| 6,326,889 B1 | 12/2001 | Van Horn et al. | |
| 6,327,017 B2 | 12/2001 | Barberi et al. | |
| 6,333,690 B1 | 12/2001 | Nelson et al. | |
| 6,354,493 B1 | 3/2002 | Mon | |
| 6,452,496 B1 | 9/2002 | Van Horn et al. | |
| 6,452,573 B1 | 9/2002 | Martinot-Lagarde et al. | |
| 6,459,376 B2 | 10/2002 | Trosper | |
| 6,466,130 B2 | 10/2002 | Van Horn et al. | |
| 6,480,699 B1 | 11/2002 | Lovoi | |
| 6,486,794 B1 | 11/2002 | Calistro et al. | |
| 6,545,605 B2 | 4/2003 | Van Horn et al. | |
| 6,566,997 B1 * | 5/2003 | Bradin | 340/10.2 |
| 6,621,417 B2 | 9/2003 | Duncan et al. | |
| 6,795,146 B2 | 9/2004 | Dozov et al. | |
| 6,831,716 B2 | 12/2004 | Dozov et al. | |
| 6,956,538 B2 * | 10/2005 | Moore | 343/878 |
| 6,973,710 B2 | 12/2005 | Kiguchi et al. | |
| 6,975,221 B2 | 12/2005 | Monck | |
| 7,022,809 B2 | 4/2006 | Lamarque et al. | |
| 7,042,358 B2 | 5/2006 | Moore | |
| 7,071,824 B2 | 7/2006 | Trosper | |
| 7,086,588 B2 | 8/2006 | Hoshina | |
| 7,123,148 B2 | 10/2006 | Trosper | |
| 7,145,459 B2 | 12/2006 | Wu et al. | |
| 7,511,601 B2 * | 3/2009 | Eisenberg et al. | 340/3.51 |
| 2005/0127174 A1 | 6/2005 | Hoshina | |
| 2006/0077045 A1 | 4/2006 | Chen | |
| 2007/0024445 A1 * | 2/2007 | Weslake et al. | 340/572.1 |
| 2007/0035395 A1 | 2/2007 | Trosper | |
| 2007/0290850 A1 | 12/2007 | Trosper | |
| 2007/0290851 A1 | 12/2007 | Trosper | |
| 2007/0290852 A1 | 12/2007 | Trosper | |
| 2008/0186178 A1 | 8/2008 | Tuttle | |
| 2010/0013637 A1 | 1/2010 | Trosper | |

FOREIGN PATENT DOCUMENTS

| | | |
|---|---|---|
| KR | 20060088481 | 8/2006 |
| WO | 2005024595 A | 3/2005 |
| WO | 2006035401 A | 4/2006 |

OTHER PUBLICATIONS

International Application No. PCT/US08/51272, Written Opinion, Jun. 27, 2008.

Perez, G.B. et al., "An Ultra-Low Power, Optically-Interrogated Smart Tagging and Identification System," Fourth IEEE Workshop on Automatic Identification Advanced Technologies (AutoID'05), pp. 187-192, Oct. 2005.

PCT/US07/23505—International Search Report (mailed May 30, 2008).

PCT/US07/23505—Written Opinion (mailed May 30, 2008).

Website: "RFID, OLED, Organic Semiconductors and Electronic Ink", http://www.organicmatter.net/node/77, © 2005, reprinted , May 9, 2006, 6 pgs.

Website: "Epson's Electronic Ink + RFID = 21st Century Price Tags", http://www.gizmodo.com/gadgets/gadgets/epsons-electronic-ink-rfid, reprinted May 9, 2006, 3 pgs.

* cited by examiner

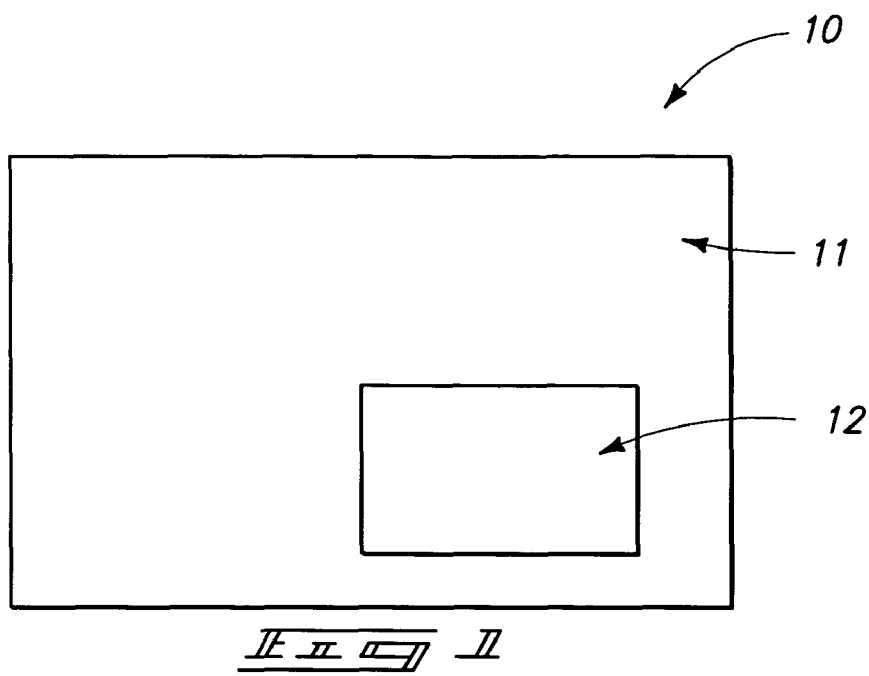
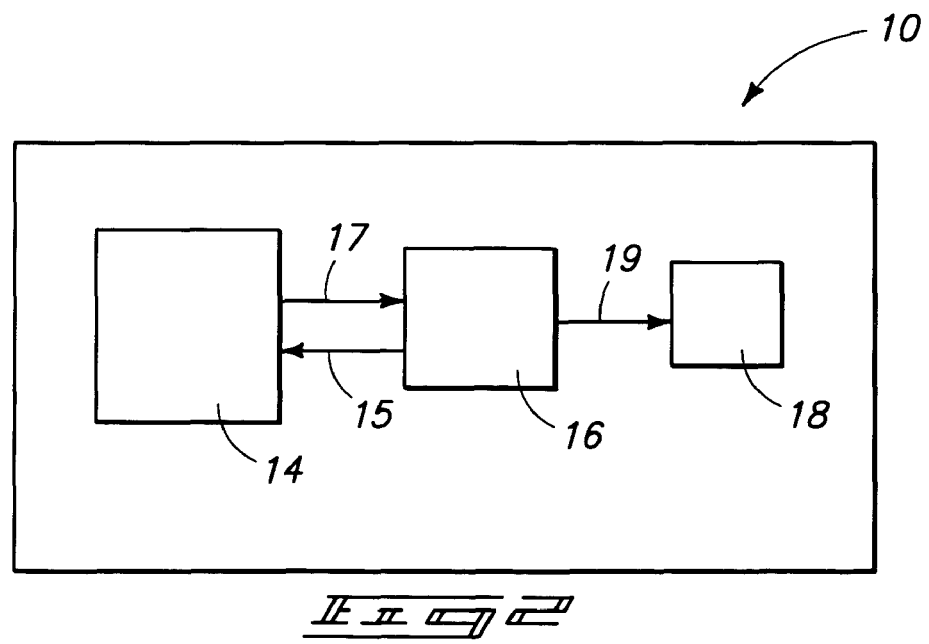

TRACKING SYSTEMS, PASSIVE RFIDS, METHODS OF LOCATING AND IDENTIFYING RFIDS, AND METHODS OF TRACKING ITEMS

TECHNICAL FIELD

The present invention, in various embodiments, relates to tracking systems, passive radio frequency identification devices (RFIDs), methods of locating and identifying RFIDs, and methods of tracking items.

BACKGROUND

RFIDs have numerous uses, including, for example, inventory tracking.

RFIDs are utilized in systems with interrogators. The interrogators communicate with the RFIDs through radio-frequency (RF) signals. The RFIDs can be either active devices or passive devices. Active devices have their own power sources, and passive devices rely solely on power from RF signals sent by the interrogators.

Active devices have an advantage in that they can be utilized further from an interrogator than passive devices, but have the disadvantage that the power source within the active devices has a limited lifespan. Also, active devices can be more expensive than passive devices. Accordingly, passive devices and active devices each have advantages and disadvantages that can render one type of device more suitable for a particular application than the other.

Present RFID systems have sufficient communications range between tag and reader such that it is possible that many tags can be present at one time within a reader antenna working volume. Thus, when the interrogator reads a tag, the user may not be able to determine which tag has been read. It could be one of many because there is no visible indicator of which tag ID corresponds with which physical tag. There exist applications, such as inventory management, where an ID number relates to one specific part. Any uncertainty or ambiguity in such systems may destroy the integrity of the inventory tracking system. Because passive tags have no power absent a reader, it has been problematic to provide a visual indicator means that persists in the absence of incident reader power on a passive tag.

BRIEF DESCRIPTION OF THE DRAWINGS

FIG. 1 is a diagrammatic view of an RFID embodiment.

FIG. 2 is a block diagram of circuitry of a passive RFID embodiment.

DETAILED DESCRIPTION OF THE PREFERRED EMBODIMENTS

Figure 3:
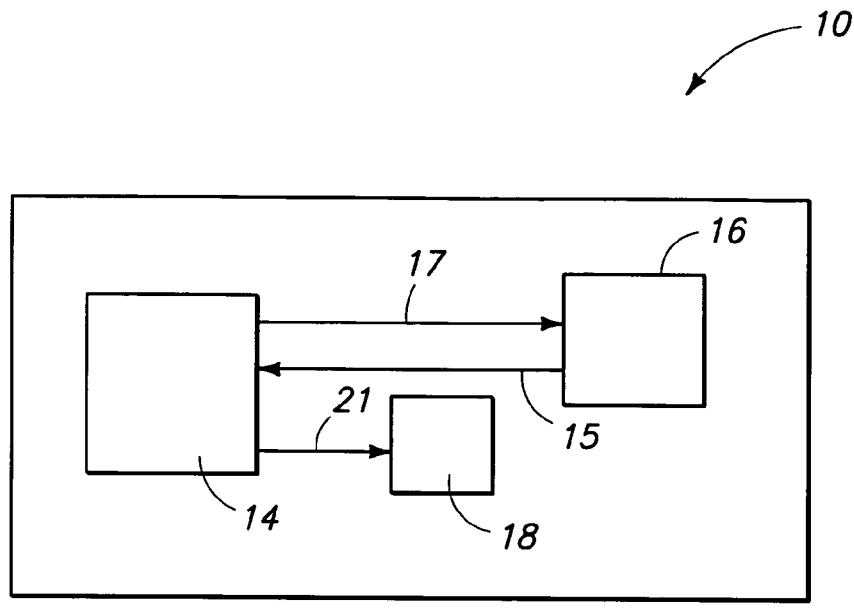
FIG. 3 is a block diagram of circuitry of another passive RFID embodiment.

Various systems and methods are disclosed for incorporating observable identifiers into RFIDs. The observable identifiers can be utilized for determining which RFIDs within a group of RFIDs are interrogated by a particular interrogator. In some embodiments, the observable indicators can be visible indicators which provide information about items tracked with RFIDs. Such information can be displayed as a bar code. Alternatively, or additionally, the information can be displayed alphanumerically. An example application utilizing an alphanumeric display is the visual display of shipping information (for instance, origin, destination or time of travel information). Alternatively, or additionally, a single ON/OFF visual indicator area on an RFID tag may serve as an indicator that an interrogator is presently communicating with that tag by its ID number. Alternatively, or additionally, multiple ON/OFF visual indicator areas on an RFID tag may serve as an indicator that an interrogator is presently communicating with that tag by its ID number.

An example of a radio frequency identification device (RFID) having a visual indicator associated therewith is shown in FIG. 1 as device 10. The device 10 comprises a surface 11. A visual identification (VID) region 12 is shown formed along a portion of such surface. Although the shown VID region comprises only a portion of surface 11, it is to be understood that the visual identification region may comprise the entirety of surface 11.

The VID region 12 comprises one or more compositions that can be modified in some selected characteristic so that a change in the VID region is perceptible to a person looking at RFID 10. Such change may be a change in color, and/or a change in an observed pattern. Suitable compositions for utilization in VID region 12 are compositions which create visible changes upon being subjected to electrical power. It can be preferred that the visible changes be induced with very little power input. For instance, if RFID 10 is a passive device, there will be little power available to cause a change. Alternatively, if device 10 is an active device, there will be more power, but it may still be preferred that as little power as possible be utilized to change observable properties within region 12 so that charge can be conserved within the power reservoir of the active device.

In some applications, very low power electronic displays (which can be referred to zero-power electronic displays if the displays convey information in the absence of power) are utilized within the VID regions. Very low power displays can be particularly useful for passive RFIDs, since passive RFIDs have little power available with which to perform enunciation (with enunciation being indication by the RFID that it has received a signal from an interrogator). Passive RFIDs get all of their power from an interrogator's electromagnetic field, and thus are generally not powered (except for a little charge remaining on a power supply capacitor) when an interrogator field is absent. Thus, if a VID region is going to maintain a perceptible changed state, such as a visible pattern, in the absence of an interrogator's electromagnetic field, such should occur with zero power. Examples of zero-power display technologies are electronic ink, electronic paper, ferroelectrics, and polymer electrochromics. For instance, Nemoptic of France manufactures various zero power display materials.

FIGS. 2 and 3 show embodiment circuit configurations suitable for passive RFIDs having VID regions.

Referring first to FIG. 2, such shows an embodiment of RFID 10 comprising an antenna 14, an integrated circuit chip 16, and circuitry 18 associated with a VID region.

The circuitry 18 can comprise a substance which changes in some characteristic visible to a person observing the VID region when power is supplied to the substance. The visible change may include, for example, one or any of a color change, contrast change and pattern change. The circuitry 18 may be characterized as visual identifier circuitry. Such visual identifier circuitry may be configured to respond to power input by altering a visual identifier observable by a person looking at the VID region 12 (FIG. 1) of RFID 10.

The integrated circuitry 16 includes RFID circuitry, and also includes circuitry for controlling flow of power to the visual identifier circuitry 18. In operation, interrogation of RFID 10 creates power in antenna 14. Such power is directed to circuitry 16 along the path diagrammatically illustrated by arrow 17. A portion of the power reaching circuitry 16 is in turn directed from circuitry 16 to visual identifier circuitry 18 along the path diagrammatically illustrated by arrow 19. FIG. 2 also shows power flow from RFID circuitry 16 to antenna 14 along a path 15. Such power flow can be optional. When present, the flow along path 15 enables the RFID to send information out to a receiving device, in addition to receiving a signal from an interrogator. The receiving device can be the same as the interrogator that sent communication to the RFID, or can be different.

Notably, the RFID of FIG. 2 comprises only one antenna. Such antenna is configured to power both the RFID circuitry and the visual identifier circuitry.

Referring to FIG. 3, another embodiment of a configuration of circuitry within a passive RFID is illustrated. In the configuration of FIG. 3, antenna 14 is directly coupled to both integrated circuitry 16 and visual identifier circuitry 18. Thus, power flow to visual identifier circuitry 18 proceeds along a new path 21 that is direct from antenna 14, rather than proceeding along a path from RFID circuitry 16 (such as the path 19 of FIG. 2).

The embodiments of FIGS. 2 and 3 may each provide advantages associated therewith for particular applications. The embodiment of FIG. 2 may be preferred if it is desired to control power input to visual identification circuitry 18. The embodiment of FIG. 2 may also be preferred if it is desired to controllably display patterns or symbols that are to update or change. In contrast, the embodiment of FIG. 3 may be preferred if it is desired to merely have the RFID visually display that it is being interrogated. As discussed in more detail below, the visual display may show a pattern or other indication that only lasts about as long as power is supplied to the RFID, or may change to a stable display that remains in its altered state for at least some extended period in the absence of power to the RFID.

Figure 4:
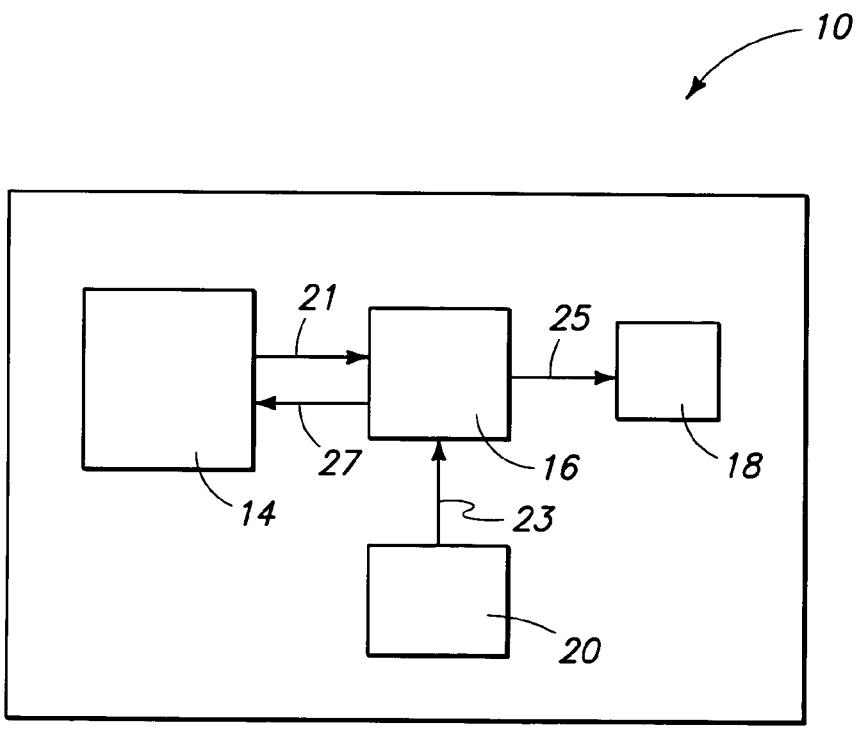
FIG. 4 is a block diagram of circuitry of an active RFID embodiment.

FIGS. 2 and 3 depict embodiments of passive RFIDs, but visual identification techniques may also be utilized with active RFIDs. FIG. 4 shows an embodiment of an RFID 10 which is an active RFID.

The RFID of FIG. 4 comprises the antenna 14, integrated circuitry 16, and visual identification circuitry 18 discussed above; and further comprises a power source 20. The power source 20 can comprise, for example, a battery.

A signal 21 is shown proceeding from antenna 14 to integrated circuitry 16. Power from the battery is shown by arrow 23 as being utilized to power integrated circuitry 16. Power is then directed from integrated circuitry 16 to visual identification circuitry 18, as shown by arrow 25. Further, power can be directed from integrated circuitry 16 to antenna 14, as designated by arrow 27.

The active RFID of FIG. 4 can be utilized alternatively to the passive RFIDs of FIGS. 2 and 3, or in addition to the passive RFIDs.

In the discussion of FIGS. 1-4, the identification region 12 of FIG. 1 is described as a visual identification region. It is to be understood, however, that other user-identifiable characteristics may be used in some embodiments. The other user-identifiable characteristics may be any characteristics that can be sensed by a person proximate the RFID (such as sound or touch). However, characteristics other than visual characteristics can utilize more power than the visual characteristics, and can be more difficult to quickly and accurately locate. Thus, it may be desirable to use visual characteristics.

Figure 5:
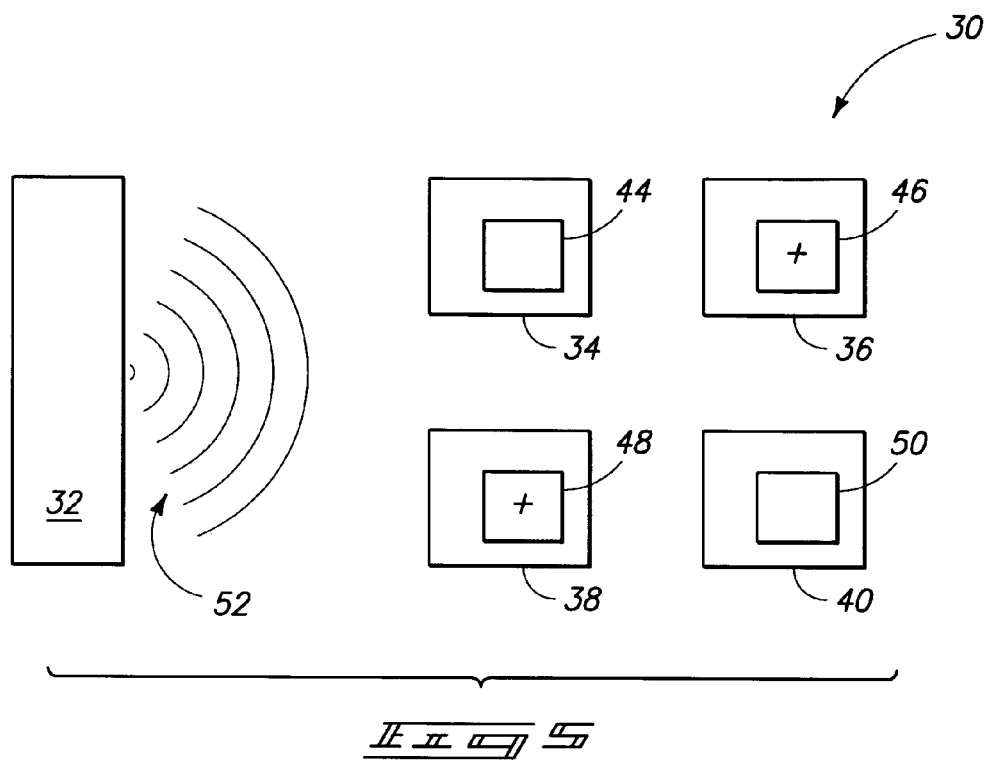
FIG. 5 is a diagram of a wireless communication system embodiment.

The RFIDs of FIGS. 1-4 can be utilized in inventory or other object tracking systems. FIG. 5 illustrates a tracking system 30 which includes an interrogator 32 and a plurality of RFIDs 34, 36, 38 and 40. The RFIDs 34, 36, 38 and 40 contain VID regions 44, 46, 48 and 50, respectively.

The interrogator 32 outputs a radio frequency signal 52 (diagrammatically illustrated by a plurality of waves) toward RFIDs 34, 36, 38 and 40.

The RFIDs comprise a first subset corresponding to RFIDs 36 and 38. The first subset is configured to change a user-observable visible property within VID regions 46 and 48 upon interacting with RF signals from interrogator 32. The RFIDs also include a second subset corresponding to RFIDs 34 and 40. The second subset does not change a user-observable visible property upon being interrogated by the signal from interrogator 32. In some embodiments, the second subset does not communicate with the radio frequency of the interrogator. The RFIDs of the first subset (RFIDs 36 and 38) are shown to have a "+" (i.e., a plus sign) formed in the VID regions 46 and 48, while the RFIDs of the second subset (RFIDs 34 and 40) do not have any symbols formed in the VID regions thereof.

The system of FIG. 5 can be used for locating particular RFIDs within a group of RFIDs. For instance, the system can be used for locating the RFIDs 36 and 38 within the group comprising RFIDs 34, 36, 38 and 40. Alternatively, the system can be utilized for locating the RFIDs 34 and 40 of such group by identifying the RFIDs which did not change upon being interrogated with the signal from interrogator 32. In any event, the system 30 can be utilized for identifying particular RFIDs by configuring a subset of the RFIDs to change a user-observable property upon interrogation, and configuring another subset which does not change the user-observable property upon such interrogation. The first and second subsets of the RFIDs can then be simultaneously exposed to interrogation, and the RFIDs that changed the user-observable property can be distinguished from those that didn't to locate one of the subsets of RFIDs relative to the other. The RFIDs are considered to be simultaneously exposed to interrogation by an interrogator if both are in the RF field of the interrogator at the same time.

In some embodiments of the FIG. 5 application, momentary visual identification of all RFID tags receiving sufficient power from an electromagnetic field gives a user an observable signal of which RFID tags are within range of an interrogator. Such signal can be a visual representation of the range of the interrogator, or a visual representation of the antenna power pattern when multiple tags are used. If the signal is used as a visual representation of an antenna power pattern, there can be a global command from the interrogator to the RFIDs that says "Whoever you are, if you hear me, turn on your indicator." This may be useful for verifying functionality of an antenna installation, and/or finding minimum acceptable reader power. Both of which may be useful for setting up new installations, and for quality and/or diagnostic checks of existing installations.

The change in the user-observable visibly property utilized in the FIG. 5 application may be designed to use very little energy, particularly if the RFIDs are passive RFIDs. Accordingly, the visual identification region can include one or more of electronic ink, electronic paper, ferroelectric material and polymer electrochromic material. The user-observable visible property can then correspond to a user-observable change in color or pattern corresponding to a change in one or more of the electronic ink, electronic paper, ferroelectric material and polymer electrochromic material.

The RFIDs may be designed so that power is only required to be provided to the VID region for a very brief period of time. This enables a relatively small amount of power to be utilized to display the visible property change. If the user-observable visible property change requires power to maintain the property, the property change may only be displayed for a very brief time to reduce the amount of power consumed in showing the property change. For instance, if the "+" symbols shown in VID regions 46 and 48 of FIG. 5 require power to maintain the symbols, the symbols may only be displayed transiently. Such transient display can be for long enough for an observer to glimpse the symbols and identify which RFID devices reacted to interrogation by interrogator 32, and yet for a duration that is really no longer than needed for such glimpse of the reacting RFIDs. For instance, in some embodiments the visible property can be displayed for less than 0.5 seconds, and in other embodiments for even less than 10 milliseconds.

Some electrically stimulated visible materials (such as some electronic inks and polymer electrochromic materials) are known to exist in two stable states that can be interchanged with input of electrical power. Such materials can be utilized in the VID regions of the RFIDs shown in FIG. 5. Interrogation of such RFIDs can then trigger a change in the materials from one state to another to trigger a visible property change corresponding to a new state of the materials. The new state will remain after power input to the VID region is ceased, and thus the new visible property will be stable after the power input is ceased. An example visible property change is a change from a blank VID region to a VID region displaying a "+" symbol. Thus, materials that exist in two stable states can be utilized to display symbols that remain within VID regions after power input to the VID regions is stopped, rather than displaying symbols that exist only transiently during the input of power to the VID regions. Materials that exist in two stable states can be considered to provide a toggle mode for a display in a VID region. The display can toggle between the two states at each communication with an interrogator, and can remain in either state between communications with the interrogator.

In the application of FIG. 5, all of the visual identification regions that reacted to interrogation show the same visual property (the "+" symbol). Such can be effective if the purpose of the visual change is to identify which RFIDs reacted to interrogation. In other applications, some of the RFIDs can display a different visual property than others. In such applications, the particular visual property displayed by an RFID can be informative of an item tagged with the RFID, as discussed below with reference to FIGS. 7-10.

Figure 6:
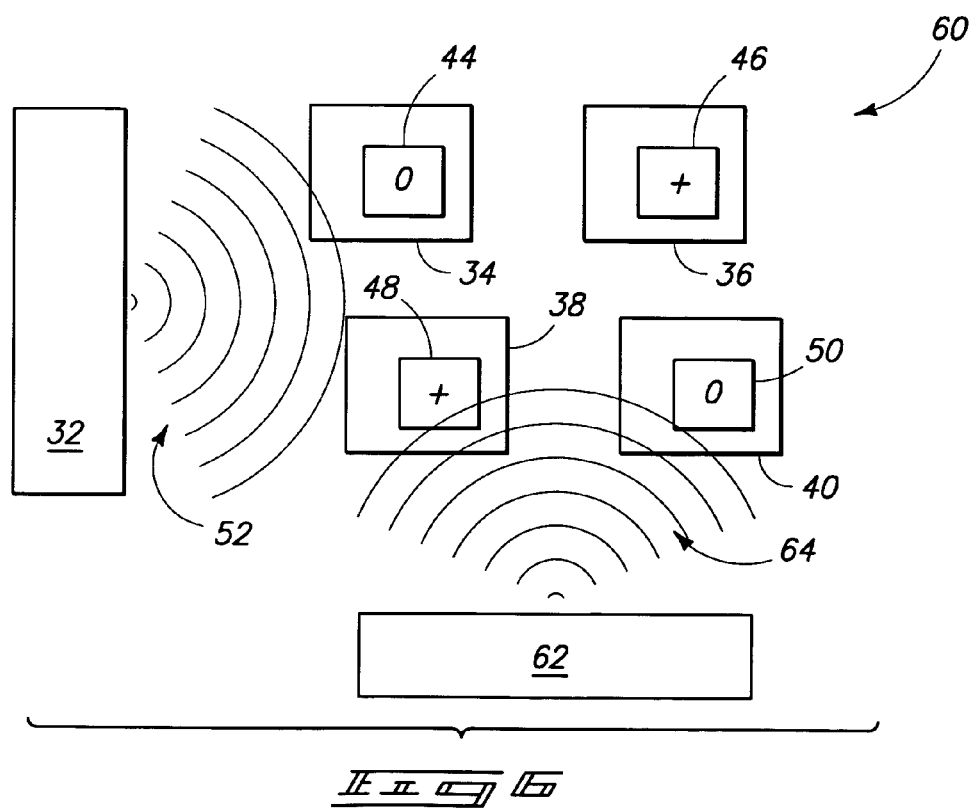
FIG. 6 is a diagram of another wireless communication system embodiment.

The application of FIG. 5 utilized a single interrogator. Other applications can utilize a plurality of interrogators. For instance, FIG. 6 shows a tracking system 60 comprising a second interrogator 62 in addition to the components of the tracking system 30 of FIG. 5. The system 60 specifically comprises the first interrogator 32 discussed above with reference to FIG. 5, and comprises the RFIDs 34, 36, 38 and 40. The RFIDs 36 and 38 correspond to the above-discussed first subset, and display the user-observable visible property of a "+" symbol upon interrogation from the first interrogator 32. The RFIDs 34 and 40 correspond to the above-discussed second subset, and in the embodiment of FIG. 6 respond to interrogation by the second interrogator 62 to display a "0" symbol. The first subset of RFIDs does not respond to the interrogation by the second interrogator, and the second subset of RFIDs does not respond to interrogation by the first interrogator. The first interrogator can thus be considered to interrogate the first subset of RFIDs selectively relative to the second set, and the second interrogator can be thus be considered to interrogate the second subset of RFIDs selectively relative to the first set.

The interrogator 62 is shown to trigger a different visual property in the second subset of RFIDs than is triggered in the first subset by the first interrogator. In other applications, the symbols generated by the first and second interrogators can be the same as one another.

A user observing RFIDs 34, 36, 38 and 40 can utilize the interrogator-generated visible property changes to distinguish RFIDs that responded to the first interrogator from those that responded to the second interrogator, and vice-versa. In the embodiment of FIG. 6, a RFID tag's visual identification changes state upon being interrogated only by certain interrogators, which are written to the RFID memory. This embodiment can be used to identify which of several interrogators are communicating with particular tags.

RFIDs having VID regions can be utilized to display particular information pertaining to tagged items. An example of such application is discussed with reference to FIGS. 7-10.

Figure 7:
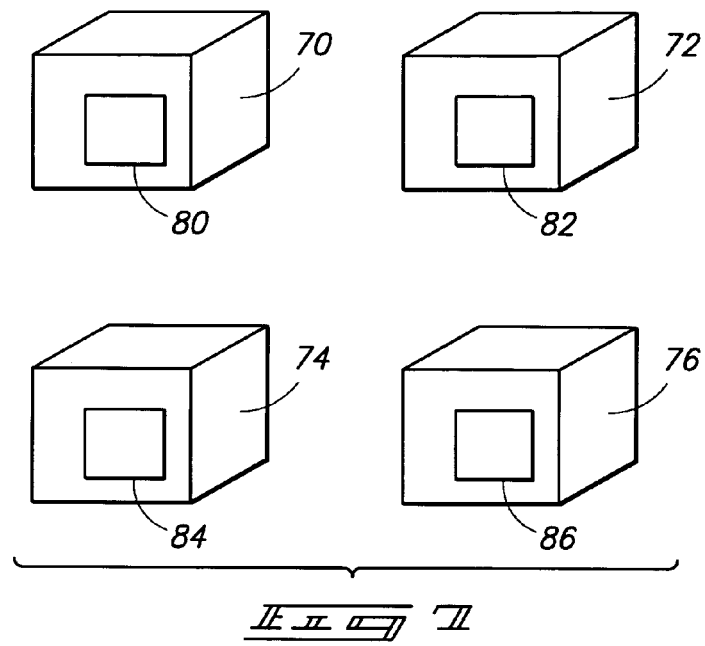
FIG. 7 is a diagram of several tagged items at a preliminary processing stage of a tracking system embodiment.

Referring to FIG. 7, a plurality of items 70, 72, 74 and 76 is shown. The items have RFIDs 80, 82, 84 and 86 associated therewith (in other words, are tagged with RFIDs 80, 82, 84 and 86). The RFIDs can be affixed to the items with glue or tape. Alternatively, the RFIDs can be fixed to boxes which retain the items. Regardless, the RFIDs associated with the items move with the items through a particular process, such as, for example, a parcel or object sorting process, or mail delivery process.

Figure 8:
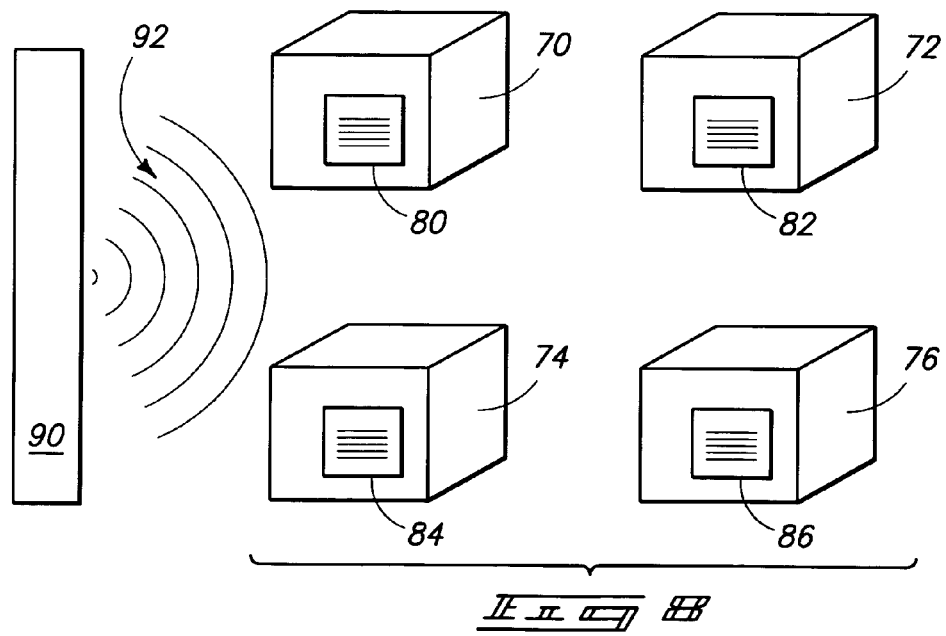
FIG. 8 is a view of the tagged items of FIG. 7 shown at a tracking stage subsequent to that of FIG. 7.

Referring to FIG. 8, the items 70, 72, 74, and 76 are provided within range of an interrogator 90. The interrogator emits an RF signal 92 which passes across RFIDs 80, 82, 84 and 86. The RFIDs can emit return signals to the interrogator to pass information to the interrogator. The RFIDs also have identification regions which generate patterns in response to the RFIDs being interrogated by interrogator 90. Such is diagrammatically illustrated by lines extending across RFIDs 80, 82, 84 and 86. The lines are shown extending horizontally, but it is to be understood that the lines may extend vertically, or in any other desired pattern.

Figure 9:
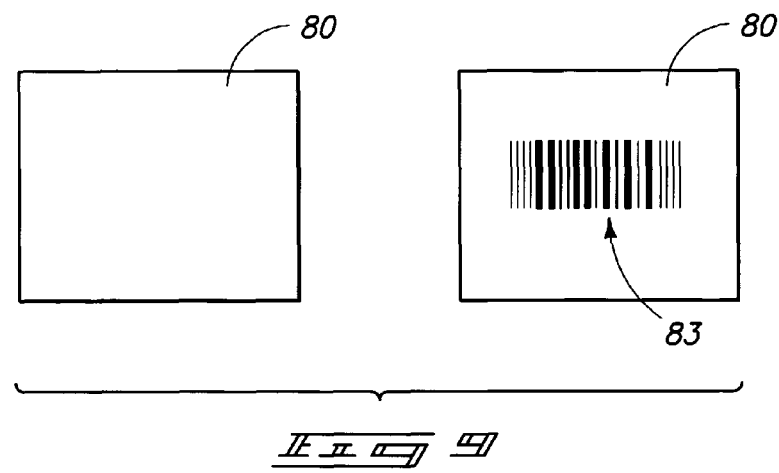
FIG. 9 illustrates a visual identification device embodiment in two different configurations.

The symbols formed on the RFIDs may be selected to be descriptive of one or more properties of the items associated with the RFIDs, and may be in a form either directly readable by a person observing the visual identification regions, or readable with appropriate equipment. For instance, FIG. 9 shows an example RFID 80 before and after interrogation. Specifically, RFID 80 is shown on the left side of FIG. 9 before interrogation, and on the right side of FIG. 9 after interrogation. The interrogation has generated a bar code 83 across RFID 80. Such bar code can be read with an appropriate reader to ascertain information about an item tagged with the RFID. The information may be selected to correspond to anything of possible interest to a person tracking the item associated with the RFID, including, for example, delivery information. In some applications, several of the RFIDs can display identical bar codes, particularly if the items associated with the RFIDs are being treated identically to one another at the processing stage in which the bar codes are displayed. In other applications, several of the RFIDs can display different bar codes from one another. Bar codes can be displayed in VID regions with any suitable material, and in some applications can be displayed with electronic paper.

Figure 10:
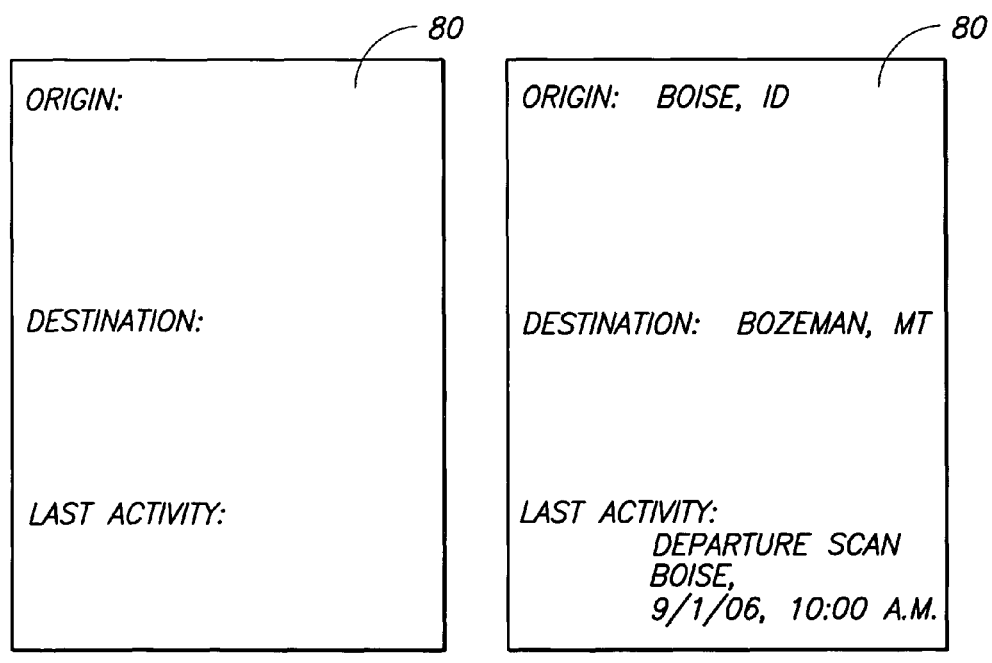
FIG. 10 illustrates another visual identification device embodiment in two different configurations.

FIG. 10 shows another embodiment of RFID 80 before and after interrogation, with the RFID being shown in the left side before interrogation and in the right side after interrogation. The RFID has printing on its surface which labels "Origin," "Destination," and "Last Activity." Interrogation by the interrogator provides information in locations (i.e., fields) proximate such printing to convey shipping information to a person observing the RFID. Specifically, the interrogated RFID indicates the point of origin, the point of destination, and the last activity that has occurred relative to the RFID. The RFID may be configured to display other shipping information alternatively, or additionally, to that shown.

The embodiments disclosed herein can be utilized in numerous applications. Conventional RFIDs typically offer no external physical indication that they have been, or are being, interrogated. A range of an interrogator is frequently not precisely known, so users can have difficulty determining which of many possible RFIDs have been read. However, placement of indicator displays on RFIDs in accordance with the embodiments disclosed herein can permit users to visually identify which RFIDs have been, or are being, interrogated. The visual identification can be in a momentary or toggle mode. If the visual identification is in a momentary mode, the visual identification can change state during interrogation (for instance, about 10 milliseconds), or for a very short time after the interrogation (for instance about 0.5 seconds). In some applications, there can be regulatory restrictions to the length of time that the visual identification is activated, such as, for example, a time of 0.5 seconds or less.

Interrogators can be considered to have "formal" sessions of communication with RFIDs during which data is exchanged between the interrogators and the RFIDS. The visual change in a VID region may be triggered to occur during formal sessions in some applications, and in other applications the visual change may be timed to occur before or after the formal sessions. If the visual change occurs before or after a formal session, the change may be induced by power provided from the interrogator. The RFID can operate in a mode to only receive the power and change the visible display, rather than to also engage in the data communication with the interrogator that would occur in a formal session.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A tracking system, comprising:
    a plurality of interrogators;
    a plurality of RFIDs, said plurality of RFIDs including a first subset of the RFIDs and a second subset of the RFIDS;
    a first of said plurality of interrogators and said first subset of RFIDs configured for selective interrogation of the first subset of the RFIDs, said first subset of the RFIDs being configured to change a first observable property responsive to interrogation; and
    a second of said plurality of interrogators and said second subset of RFIDs configured for selective interrogation of the second subset of the RFIDs, said second subset of the RFIDs being configured to change a second observable property responsive to interrogation, wherein at least one RFID is configured to display shipping information responsive to interrogation by an interrogator.

2. The tracking system of claim 1, wherein the RFIDs are passive RFIDs.

3. The tracking system of claim 2, wherein the changes in the first and second observable properties cease without power input.

4. The tracking system of claim 2, wherein the changes in the first and second observable properties are transient changes having a duration of less than 0.5 seconds.

5. The tracking system of claim 2, wherein the changes in the first and second observable properties are stable without power input.

6. The tracking system of claim 2, wherein the changes in the first and second observable properties are visual changes.

7. The tracking system of claim 1, wherein the changes in the first and second observable properties are the same as one another.

8. The tracking system of claim 1, wherein the changes in the first and second observable properties are different from one another.

9. The tracking system of claim 1, wherein at least one RFID is configured to display a bar code responsive to interrogation by an interrogator.

10. The tracking system of claim 9, wherein the at least one RFID comprises a plurality of RFIDs configured to display bar codes responsive to interrogation by an interrogator.

11. The tracking system of claim 10, wherein at least two of the RFIDs of the plurality are configured to display the same bar code as one another.

12. The tracking system of claim 10, wherein at least two of the RFIDs of the plurality are configured to display different bar codes from one another.

13. The tracking system of claim 1, wherein at least one RFID is a passive RFID, comprising:
    only one antenna, the antenna configured to provide power upon being interrogated by an interrogator;
    an integrated-circuit chip configured to be powered with the power from the antenna; and
    a visual identifier configured to be altered with the power from the antenna.

14. A method of locating particular RFIDs within a group of RFIDs, comprising:
    providing a system comprising a plurality of RFIDs, and comprising an interrogator configured to interrogate a first subset of the RFIDs responsive thereto without interrogating a second subset of RFIDs within the group, said first subset of the RFIDs being configured to change an observable property responsive to interrogation;
    simultaneously exposing the first and second subsets of the RFIDs to interrogation by said interrogator to cause the RFIDs of the first subset to change the observable property; and
    distinguishing the RFIDs exhibiting the changed observable property from the RFIDs not exhibiting a change in the observable property to locate the first subset of the RFIDs;

providing a set of RFIDs associated with items;
interrogating the RFIDs to cause the RFIDS to display shipping information pertaining to the associated items.

15. The method of claim 14, wherein the interrogator is a first interrogator and wherein the observable property is a first observable property, and further comprising:
providing the system to include a second interrogator configured to interrogate the second subset of the RFIDs responsive thereto without interrogating the first subset of the RFIDs, said second subset of the RFIDs being configured to change a second observable property upon interrogation by the second interrogator;
simultaneously exposing the first and second subsets of the RFIDs to interrogation by the second interrogator to cause the RFIDs of the second subset to change the second observable property; and
distinguishing the RFIDs exhibiting the changed second observable property from the RFIDs not exhibiting a change in the second observable property to locate the second subset of the RFIDs.

16. The method of claim 14, wherein the first subset of RFIDs include a plurality of passive RFIDs; at least one of the passive RFIDs being configured to change an observable visible property responsive to interrogation by an interrogator; the observable visible property change being a transient change that has a duration of less than 0.5 seconds; and interrogating said at least one of the passive RFIDs with the interrogator to trigger the observable visible property.

17. The method of claim 14, further comprising observing the triggered observable property change to ascertain an antenna power pattern of the interrogator.

18. The method of claim 14, wherein a set of the RFIDs include visible identification regions comprising at least one of electronic ink, electronic paper, ferroelectric material, and polymer electrochromic material; and the observable property change includes an observable change in the at least one of electronic ink, electronic paper, ferroelectric material, and polymer electrochromic material.

19. The method of claim 14, wherein the plurality of RFIDs comprises a set of passive RFIDs; and the changed observable property remains without power input after the exposing.

20. The method of claim 14, further comprising:
providing a set of RFIDs associated with items; and
interrogating the RFIDs to cause the RFIDS to display bar codes which provide information regarding the items associated with the RFIDs.

21. The method of claim 14, wherein a set of the RFIDs include passive RFIDs.

22. The method of claim 14, wherein a set of the RFIDs include active RFIDs.

* * * * *